US010817327B2

(12) United States Patent
Vashishtha et al.

(10) Patent No.: US 10,817,327 B2
(45) Date of Patent: Oct. 27, 2020

(54) NETWORK-ACCESSIBLE VOLUME CREATION AND LEASING

(71) Applicant: Amazon Technologies, Inc., Seattle, WA (US)

(72) Inventors: Rohit Vashishtha, Seattle, WA (US); Jerry Lin, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/436,348

(22) Filed: Jun. 10, 2019

(65) Prior Publication Data

US 2019/0294466 A1 Sep. 26, 2019

Related U.S. Application Data

(62) Division of application No. 15/273,609, filed on Sep. 22, 2016, now Pat. No. 10,360,057.

(51) Int. Cl.
*H04L 29/08* (2006.01)
*G06F 9/455* (2018.01)
*G06F 3/06* (2006.01)

(52) U.S. Cl.
CPC .......... *G06F 9/45558* (2013.01); *G06F 3/067* (2013.01); *H04L 67/1097* (2013.01); *G06F 2009/45579* (2013.01); *G06F 2009/45583* (2013.01); *G06F 2009/45595* (2013.01)

(58) Field of Classification Search
CPC .............. G06F 9/45558; G06F 3/067; G06F 2009/45579; G06F 2009/45595; G06F 2009/45583; G06F 3/0632; G06F 3/0611; G06F 3/0631; G06F 2009/45562; G06F 9/466; G06F 12/00; G06F 9/5016; H04L 67/1097
USPC ................................ 709/203, 215, 226, 245
See application file for complete search history.

(56) References Cited

U.S. PATENT DOCUMENTS

| 6,917,976 | B1 * | 7/2005 | Slaughter | G06F 9/465 709/226 |
| 7,139,811 | B2 * | 11/2006 | Lev Ran | G06F 9/546 709/217 |
| 7,401,131 | B2 | 7/2008 | Robertson et al. | |
| 7,970,851 | B2 * | 6/2011 | Ponnappan | G06F 11/3485 709/211 |
| 8,291,159 | B2 * | 10/2012 | Rajagopal | G06F 3/0605 709/226 |
| 8,516,137 | B2 | 8/2013 | Calder et al. | |
| 8,725,979 | B1 * | 5/2014 | Jennings | G06F 3/0605 707/999.2 |
| 8,838,793 | B1 * | 9/2014 | Thrasher | H04L 67/1097 709/223 |
| 9,069,710 | B1 * | 6/2015 | Modukuri | G06F 11/2051 |
| 9,344,235 | B1 * | 5/2016 | Putra | G06F 3/0608 |

(Continued)

*Primary Examiner* — Michael Won
(74) *Attorney, Agent, or Firm* — Knobbe, Martens, Olson & Bear, LLP

(57) ABSTRACT

A data volume can be created on a network-accessible storage device in a data center for use by a virtual machine instance. More specifically, a management system of the data center may request storage servers to allocate space for the data volume. Prior to receiving confirmation that the data volume has been created, the management system may further request the storage servers to establish a lease that authorizes the virtual machine access to the data volume.

18 Claims, 5 Drawing Sheets

(56) References Cited

U.S. PATENT DOCUMENTS

| | | | |
|---|---|---|---|
| 9,350,801 B2 | 5/2016 | Parakh et al. | |
| 9,369,518 B2 | 6/2016 | Parakh et al. | |
| 9,449,008 B1* | 9/2016 | Oikarinen | G06F 16/1774 |
| 9,462,056 B1* | 10/2016 | Protopopov | H04L 67/2838 |
| 9,569,459 B1* | 2/2017 | Strauss | G06F 16/184 |
| 9,594,598 B1 | 3/2017 | Brouwer et al. | |
| 9,780,993 B2 | 10/2017 | Parakh et al. | |
| 9,843,631 B2 | 12/2017 | Parakh et al. | |
| 2008/0281967 A1* | 11/2008 | Muhlestein | H04L 63/104 |
| | | | 709/226 |
| 2009/0112880 A1 | 4/2009 | Oliveira et al. | |
| 2010/0198972 A1* | 8/2010 | Umbehocker | G06F 9/5016 |
| | | | 709/226 |
| 2011/0055261 A1* | 3/2011 | Makkar | H04L 67/1097 |
| | | | 707/770 |
| 2012/0110188 A1* | 5/2012 | Van Biljon | G06F 21/6218 |
| | | | 709/226 |
| 2013/0159998 A1 | 6/2013 | Cawlfield et al. | |
| 2013/0160008 A1 | 6/2013 | Cawlfield et al. | |
| 2013/0332700 A1* | 12/2013 | Kopylovitz | G06F 3/0631 |
| | | | 711/209 |
| 2014/0095826 A1* | 4/2014 | Rajagopal | H04L 67/1097 |
| | | | 711/170 |
| 2015/0277802 A1* | 10/2015 | Oikarinen | G06F 3/0604 |
| | | | 711/114 |
| 2017/0222886 A1* | 8/2017 | S | H04L 67/1097 |
| 2017/0235525 A1 | 8/2017 | Calder et al. | |
| 2017/0277709 A1* | 9/2017 | Strauss | G06F 3/0631 |
| 2018/0018270 A1* | 1/2018 | Kilaru | G06F 16/1748 |
| 2018/0095845 A1* | 4/2018 | Sanakkayala | G06F 11/3495 |
| 2018/0113623 A1* | 4/2018 | Sancheti | G06F 11/1469 |
| 2018/0253261 A1* | 9/2018 | Kripalani | G06Q 10/087 |
| 2018/0275913 A1* | 9/2018 | Mitkar | G06F 9/45558 |
| 2019/0294466 A1* | 9/2019 | Vashishtha | G06F 9/45558 |

* cited by examiner

NETWORK-ACCESSIBLE VOLUME CREATION AND LEASING

CROSS REFERENCE TO RELATED APPLICATION

This application is a divisional of U.S. patent application Ser. No. 15/273,609 entitled NETWORK-ACCESSIBLE VOLUME CREATION AND LEASING, and filed Sep. 22, 2016, the entirety of which is incorporated herein by reference.

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like. In some environments, a user may request data storage space specifically for use by a virtual machine that the user or another party manages or controls.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
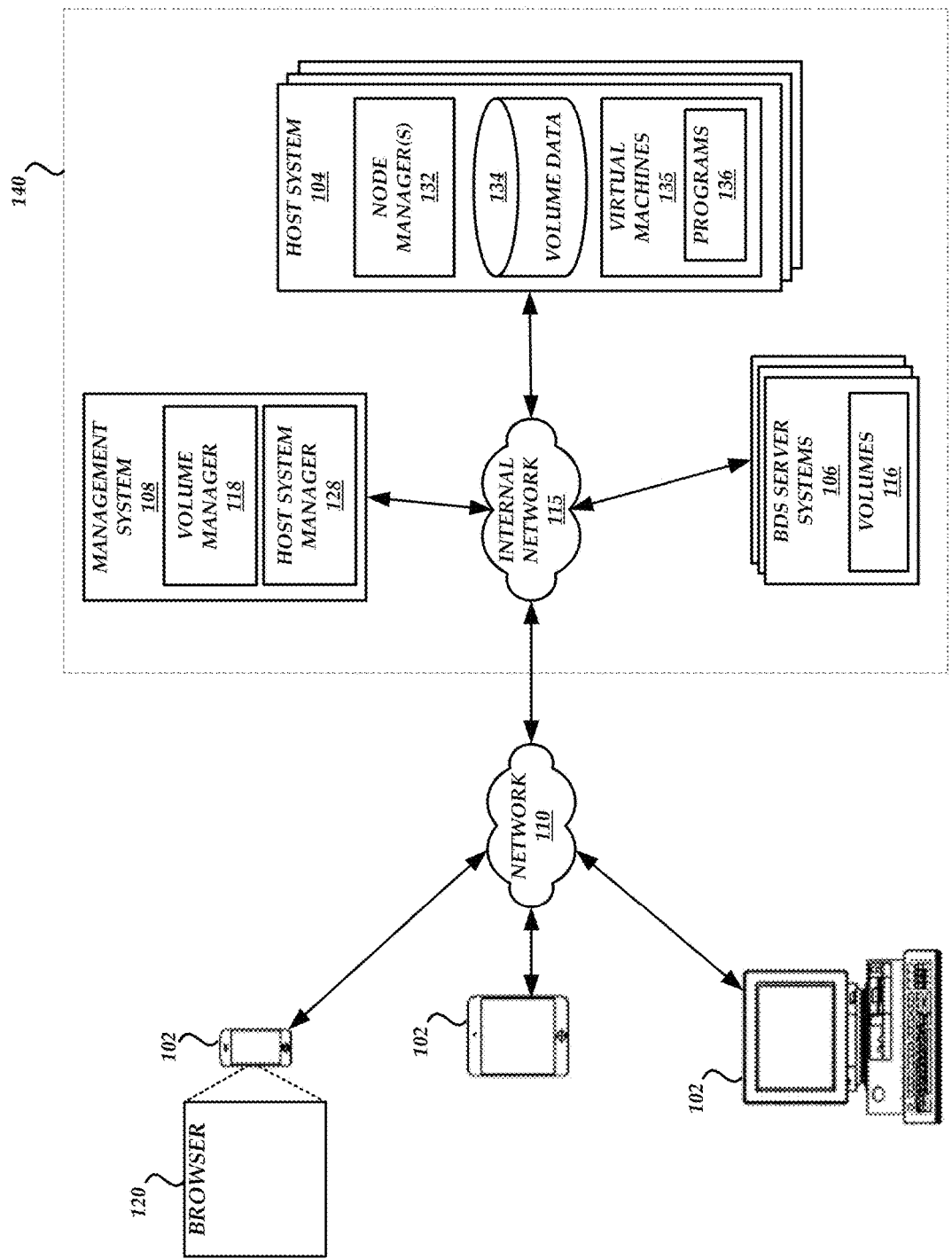
FIG. 1 is a block diagram of a data volume creation and leasing environment that includes a data center and user devices, according to one embodiment.

As described above, in some environments, a user may request a network service provider to create data storage space specifically for use by a virtual machine. More specifically, a user may request creation of a network-accessible data volume to be attached to an instance of virtual machine under control by the user or another party. In response, in some embodiments, the network service provider may create one or more data volumes, which may correspond to a unique identifier authorizing exclusive or nonexclusive access to the data volume by the virtual machine. In other embodiments, the network service provider may grant access (exclusive or nonexclusive) to one or more previously instantiated data volumes.

The network service provider typically exercises access control to a data volume after availability of the volume is confirmed. For example, the network service provider first confirms that data storage space has been successfully allocated for different partitions of the data volume with various servers. Upon confirmation of the volume's availability, the network service provider requests the servers to establish a lease (or lock) on the data volume. The lease (or lock) corresponds to a unique identifier authorizing exclusive or nonexclusive access to the data volume by an entity that can present identification of the lease. Illustratively, one or more servers hosting the data volume associates the lease identifier with the data volume and maintains some form (e.g., encrypted, modified, or plaintext form) of the lease identifier for comparison against requests to access the data volume. If the access requests include a matching identification of the lease, the data storage server(s) may grant the requestor access to the data volume.

Generally described, various embodiments disclosed herein enable at least some overlap of processing time between the creation of a data volume on network-based data storage devices and the creation of a lease on the data volume, for access by a virtual machine. This overlap in processing time may shorten the wait between an initiation of a request for the data volume and a time when a virtual machine may actually access the data volume, thus improving the efficiency and responsiveness of the network server provider's overall system.

Illustratively, a user, via a user device, can generate a request to create a data volume, for use by a virtual machine under control of the user or another party. The request can be transmitted over a network from the user device to a host system manager of a data center. The data center includes data repositories and systems that manage the data repositories.

The host system manager communicates with a volume manager of the data center to process the request. Additionally, the volume manager determines the partitioning of the requested data volume among data repositories (e.g., network-accessible data storage servers). Illustratively, a data volume may be divided into multiple partitions in accordance with the data volume creation request and/or based on configurations, availability, or other characteristics of various data storage servers that may host a portion of the data volume. Before, during, or after the determination of volume partitioning, the volume manager generates and returns to the host system manager identification information for both the data volume and a corresponding lease on the data volume. For example, the volume manager simply generates and returns two alphanumerical character strings as the identification for the data volume and the lease, respectively.

The volume manager then contacts data repository systems to initiate the establishment of the data volume and its corresponding lease. Illustratively, the volume manager requests various data repository systems to allocate storage space for their respective volume partitions and establish the corresponding lease for accessing the volume partition. In some embodiments, the volume manager achieves this by simultaneously transmitting identification information for both the data volume and the lease to individual data repository systems. For example, both type of identification information can be transmitted as parameters or arguments via a same API or web interface. In some embodiments, the volume manager achieves this by transmitting identification information for the data volume first. But prior to any confirmation of the data volume's availability, the volume manger transmits identification information for the lease to be processed by individual data repository systems. In this case, the creations of the data volume and lease still have at least some temporal overlap with each other.

After receiving identification information for the data volume and the lease, the host system manager may initiate the attachment of the data volume to the virtual machine. The host system manager polls the volume manager using data volume identification information to determine the volume's availability. Once the volume is confirmed as available, the host system manager transmits identification information for the data volume and the lease to a node manager (e.g., a hypervisor on a host computing device) that manages the virtual machine, and requests the node manager to attach the data volume to the virtual machine. After volume attachment, the node manager polls the volume manager to confirm establishment of the lease on the volume. Once the lease is confirmed as established, the node manager may initiate connections to various volume partitions located on different data repositories based on the lease identification information, and enable access to the data volume by the virtual machine.

Additional details on the operations performed by the different components of the data center to process a request to modify operational parameters of a user's data volume are described below with respect to FIGS. 2A, 2B, and 3.

Example Data Volume Creation and Leasing Environment

FIG. 1 is a block diagram of a data volume creation and leasing environment that includes a data center 140 and user devices 102, according to one embodiment. As illustrated in FIG. 1, the data center 140 includes host systems 104, a pool of block data storage (BDS) server systems 106, and a management system 108. In an embodiment, the data center 140 includes one or more of the host systems 104.

The host systems 104 are configured to manage the execution of virtual machines 135. For example, each virtual machine 135 can act as an independent computing node for executing one or more programs 136 (e.g., document applications, account management applications, database application, etc.) as instructed by a user via the user device 102. The host systems 104 can include one or more node managers 132 that execute in memory of the host system 104 such that the node managers 132 manage the virtual machines 135. In some embodiments, the executing node manager 132 and virtual machines 135 can execute as distinct processes on an operating system executed on the host system 104.

Illustratively, a node manager 132 may store information about data volumes 116 attached to the virtual machines 135 executing on the host system 104 in volume data store 134. For example, the information can include identification information (e.g., one or more unique volume identifiers) of a volume 116, identification information (e.g., one or more unique lease identifiers) of a lease on the volume 116, storage capacity of the volume 116, the amount of storage available in the volume 116, a data storage type of the volume 116 (e.g., HDD, SSD, Flash memory, hybrid storage devices, etc.), a level of performance of the volume 116 (e.g., rate of IOPS, throughput, bandwidth, etc.), geographical or network location of volume 116 partitions, or the like. Having volume data store 134 on the host system 104 is illustrative. Volume data store 134 could reside on a variety of systems or components within the data center 140, including for example BDS server systems 106 or management system 108.

The pool of BDS server systems 106 can each include one or more storage devices (e.g., HDDs, SSDs, hybrid storage devices, etc.) that provide local block storage. The pool of BDS server systems 106 are configured to control and provide reliable non-local block data storage to the virtual machines 135. For example, the BDS server systems 106 can include local block storage for use in storing one or more volumes 116 or their partitions. Illustratively, individual BDS server systems may control access to volumes 116 or their partitions based on leases (or locks) on the volumes. A lease may correspond to a unique identifier (e.g., a numerical value, a string of characters, an alphanumeric phrase, or the like) associated with a particular volume. A BDS server system maintains the lease and may only authorize another entity (e.g., system, device, process, thread, or the like) that can present an indication or identification of the lease to access (e.g., reading or writing operations) the particular volume or a partition thereof.

The virtual machines 135 or the programs 136 executed by the virtual machines 135 may have access to the volumes 116 via internal network 115, which is a network internal to the data center 140. The internal network 115 may include various networking devices (e.g., routers, switches, gateways, etc.) that are not shown. The internal network 115 may be further coupled to an external network, such as the network 110. Multiple remote archival storage systems (not shown) external to the data center 140 may also be used to store additional volumes accessible by the virtual machines 135 via the internal network 115 or the network 110.

In an embodiment, a user, via the user device 102, is able to access a volumes 116 stored on the local block storage of the BDS server systems 106 through an attached virtual machines 135, as if the volume 116 is stored on block storage devices local to the virtual machine 135. In this case, the volume 116 can be addressed with offsets, lengths, and other such conventional block device aspects. This allows the user device 102 to interact with the virtual machine 135 as if its attached volume 116 was a local hard drive or block device.

The management system 108 may be one or more server computers that are configured to manage components and systems in the data center 140. For example, the management system 108 may provide a variety of services related to providing non-local block data storage functionality, including the management of user accounts (e.g., creation, deletion, billing, etc.); the creation, use, and deletion of volumes 116 or snapshot copies of those volumes 116; the collection or processing of performance or auditing data related to the use of volumes 116 or snapshot copies of those volumes 116; the obtaining of payment from users for the use of the volumes 116 or snapshot copies of those volumes 116; or the like. The management system 108 can also interface with user devices 102 for various operations related to virtual machines 135, such as coordinating with the node managers 132 to manage the use of the volumes 116 by the virtual machines 135. Alternatively, the management system 108 or the node managers 132 can independently manage the use of the volumes 116 by the virtual machines 135. The management system 108 can maintain a database that includes information about the volumes 116.

While the management system 108 is illustrated in FIG. 1 as being a separate, centralized system within the data center 140, this is not meant to be limiting. The functionality of the management system 108 can in part or in whole be carried out by one or more of the host systems 104 or the BDS server systems 106. The management system 108 can be logically considered as residing in one or more control plane(s), or control environment(s), with the data volumes 116 and block storage devices of the BDS server systems 106 residing in a separate data plane, or data environment.

In an embodiment, the management system 108 includes a volume manager 118 that is configured to control the creation, leasing, and deletion of the volumes 116, and the management system 108 also includes a host system manager 128 that is configured to interface with user devices 102 for processing user requests related to data volumes 116 accessible by virtual machines 135. For example, a user via the user device 102 can generate and send a request (e.g., an application programming interface (API) call, a web service call, etc.) to the host system manager 118 to create a new data volume 116 to be attached to a virtual machine 135 associated with the user. The host system manager 118 may process this request in coordination with the volume manager 128, a node manager 132, and one or more BDS server systems 106 in accordance with the methods or processes disclosed herein. In some embodiments, the volume manager 118 and the host system manager 128 may reside in separate management systems connected via the internal network 115.

The host systems 104 and the management system 108 may each include one or more processors, memory that stores instructions executed by the one or more processors, network interfaces, application-specific hardware, or other hardware components that allow the systems to perform the functionality described herein. The BDS server systems 106 may include one or more processors, memory that stores instructions executed by the one or more processors, network interfaces, data storage devices (e.g., HDDs, SSDs, Flash memory, hybrid storage devices, etc. that can store the volumes 116 or volume partitions), application-specific hardware, or other hardware components that allow the BDS server systems 106 to perform the functionality described herein.

While a single data center 140 is illustrated in FIG. 1, this is not meant to be limiting. The data volume creation and leasing environment may include any number of data centers, where the multiple data centers can be coupled via the network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to or from the Internet.

It will be appreciated that the example of FIG. 1 has been simplified for the purposes of explanation, and that the number and organization of components in the data center 140 may be much larger than what is depicted in FIG. 1. For example, as one illustrative embodiment, there may be thousands of computing systems per data center 140, with some of those computing systems being host systems 104 that may each host multiple virtual machines 135 or with some of those computing systems being BDS server systems 106 that may each store several volumes 116 or volume partitions. Furthermore, hundreds or thousands (or more) volumes 116 may be stored on the BDS server systems 106, depending on the number and storage capacity of BDS server systems 106 or the size of the volumes 116. It will be appreciated that in other embodiments, other numbers of computing systems, virtual machines 135, programs 136, or volumes 116 may be used.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute the browser application 120 to communicate via the network 110 with other computing systems, such as the data center 140, in order to transmit requests (e.g., API calls) related to data volumes 116 and/or virtual machines 135.

Example Block Diagram for Creating and Leasing a Data Volume

Figure 2A:
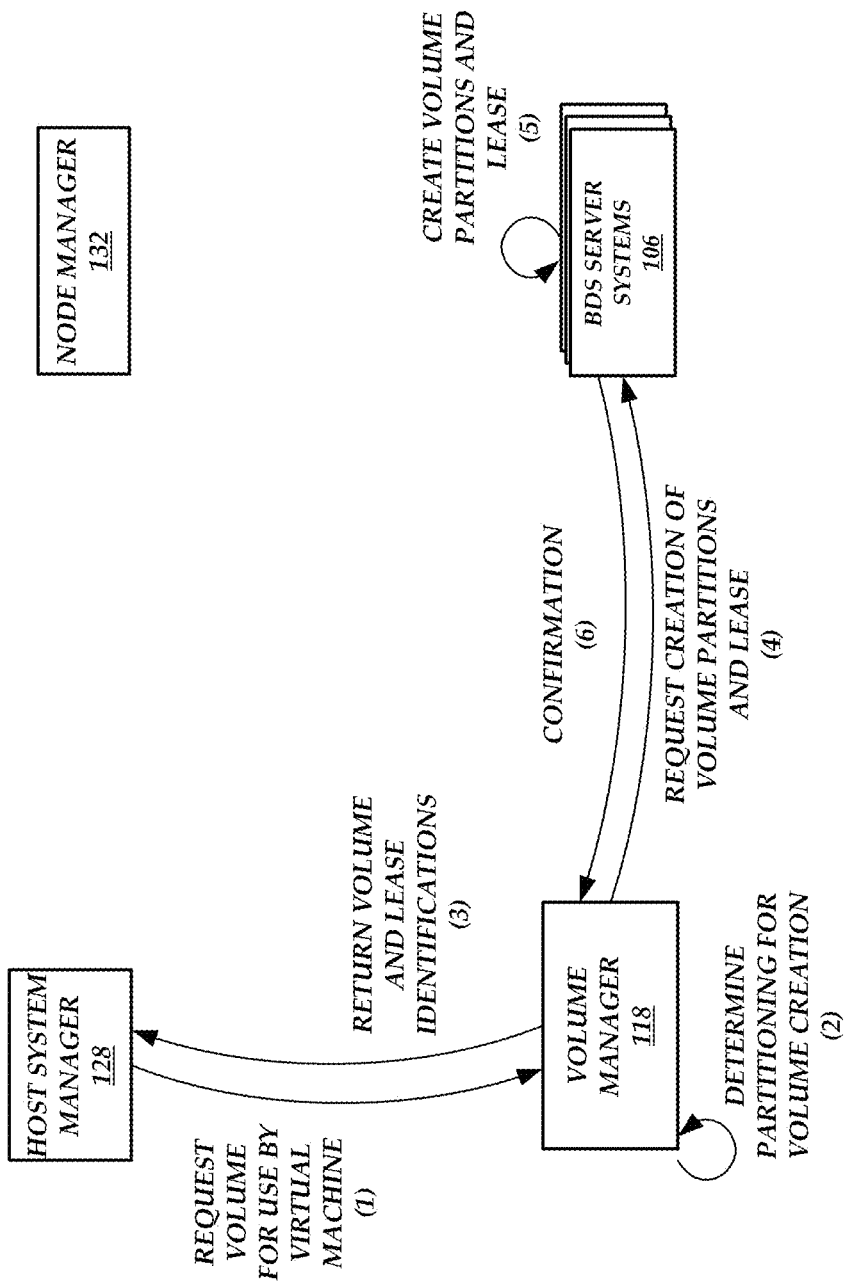
FIG. 2A is a block diagram of the data volume creation and leasing environment of FIG. 1 illustrating the operations performed by the components of the data volume creation and leasing environment to create a data volume with lease, according to one embodiment.

FIG. 2A is a block diagram of the data volume creation and leasing environment of FIG. 1 illustrating the operations performed by the components of the data volume creation and leasing environment to create a data volume 116 with lease, according to one embodiment. As illustrated in FIG. 2A, at (1), the host system manager 128 transmits a request to the volume manager 118 for creation of a volume 116 for use by a virtual machine 135. The volume creation request may be generated by the host system manager 128 independently, or be based on a corresponding volume creation request received from a user device 102. Illustratively, the request can include an identification of one or more operational criteria of the volume 116 (e.g., a storage capacity, a data storage type (e.g., hard disk drive (HDD), solid state device (SSD), Flash memory, hybrid storage devices, etc.), a level of expected performance (e.g., rate of input/output operations per second (IOPS), throughput, bandwidth, etc.), a geographical location, or the like). Additionally, the request may include identification information of the virtual machine 135, an associated user or user device 102, etc.

At (2), the volume manager 118 determines the partitioning of the volume 116 among various BDS server systems 106 or their associated data storage depositories. The volume manager 118 or an associated service may track various performance and capacity measurements of the BDS server systems 106, for example, by periodically polling individual BDS server systems 106. The volume manager 118 may compare the performance and capacity measures of the BDS server systems 106 against the operational criteria included in the volume creation request, and determine how the volume 116 should be partitioned among BDS server systems 106 and identify the BDS server system(s) 106 where volume (partitions) will be created. In some embodiments, the volume manger 118 may determine that the volume 116 should correspond to a single partition located within a specific BDS server system 106. In some embodiments, the volume manger 118 may determine that the volume 116 should correspond to multiple partitions each located within a distinct BDS server system 106. In other embodiments, the volume manger 118 may determine that the volume 116 may include a subset of partitions within a same BDS server system 106.

At (3), the volume manager 118 generates identification information (e.g., respective unique alphanumeric identifiers) for the volume 116 and a lease on the volume 116, and returns the identification information to the host system manger 128. As described above, the lease (or lock) may correspond to a unique identifier authorizing exclusive or nonexclusive access to the data volume by an entity that can present identification of the lease. The identification information for the lease may or may not be dependent on the identification information for the volume 116, and the two pieces of identification information may be generated sequentially or in parallel, by the volume manager 118. In some embodiments, the volume manger 118 also transmits to the host system manager 128 volume partitioning information as well as identification information (e.g., network paths, domains, subdomains, or other identifiers) regarding BDS server system(s) 106 where each partition is located. It should be noted that step (3) can be performed before, during, or after step (2).

At (4), the volume manager 118 sends request(s) to one or more BDS server systems 106 as identified at (3) for creation of partition(s) of the volume 116 and for creation of the lease on the volume 116. In some embodiments, a same request may include identification information for both the volume 116 and the lease, for example, as parameters or arguments in a same API or web service call. In some embodiments, the volume manager 118 may send two separate requests to individual BDS server systems 106. Illustratively, the volume manager 118 may send a first request for volume partition creation that includes identification information for the volume 116, and prior to confirming creation of the volume partition, sending a second request for lease creation that includes identification information for the lease.

At (5), depending on the content of the requests, the BDS server system(s) 106 creates volume partition(s) and/or the corresponding lease. Illustratively, a BDS server system 106 allocates data blocks in one or more storage devices for one or more volume partitions and provisions the partition(s) accordingly, and the BDS server system 106 further stores the lease identification information or otherwise associates the lease identification information with the volume partition(s) as an authority for granting access. The creations of volume partition(s) and the lease at individual BDS server systems 106 may be simultaneous, at least partially overlapping in time, or sequential.

At (6), the BDS server system(s) 106 confirm successful creation of partitions of the volume 116 and successful creation of the lease on the volume 116 to volume manager 118. This may be achieved by individual BDS server system(s) 106 sending confirmation messages to the volume manager 118, or, by the volume manger 118 periodically polling individual BDS server system(s) 106 to determine availability of the volume partitions and the establishment of the lease. The confirmations of volume partitions and the lease may or may not be simultaneous as received from a particular BDS server system 106, and may also differ temporally among different BDS server systems 106.

Figure 2B:
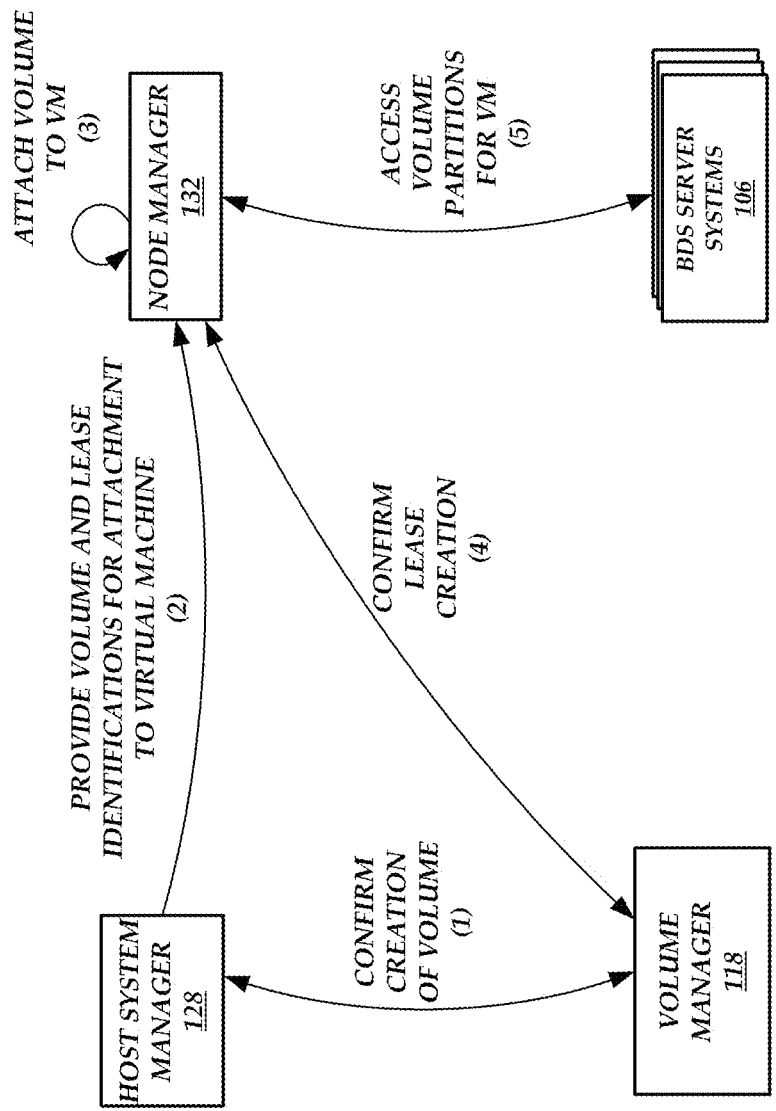
FIG. 2B is a block diagram of the data volume modification environment of FIG. 1 illustrating the operations performed by the components of the data volume creation and leasing environment to attach a leased data volume to a virtual machine, according to one embodiment.

FIG. 2B is a block diagram of the data volume creation and leasing environment of FIG. 1 illustrating the operations performed by the components of the data volume creation and leasing environment to attach a leased data volume 116 to a virtual machine 135, according to one embodiment.

At (1), the volume manager 118 confirms creation of the volume 116 with the host system manager 128. In some embodiments, this may be achieved by the volume manager 118 sending a confirmation message to the host system manager 128. In other embodiments, the host system manger 128 may periodically poll the volume manger 118 with volume identification information until the volume manger 118 indicates the availability of volume 116. In some embodiment, the volume manager 118 transmits to the host system manager 128 updated volume partitioning information and identification information for BDS server systems 106 that host each volume partition.

At (2), the host system manager 128 provides volume and lease identification information to a node manager 132 that manages the virtual machine 135 for attaching the volume to the virtual machine 135. Illustratively, this may be achieved via one or more API or web service calls from the host system manager 128 to the node manager 132. In some embodiments, the host system manager 128 further provides volume partitioning information and identification information regarding corresponding BDS server system(s) 106 to the node manager 132. In other embodiments, the host system manager 128 stores the volume partitioning information and identification information regarding corresponding BDS server system(s) 106 in a database accessible by the node manager 132, such as volume database 134.

At (3), the node manager 132 attaches the volume 116 to the virtual machine 135. Illustratively, the node manager 132 may associate various programs 136 executing on the virtual machine 135 with the volume 116, provide storage identifiers or references local to the virtual machine 135 and map the local storage identifiers or references to corresponding partitions of the volume 116. The node manager 132 also stores the lease identification information to associate with the virtual machine 135. At (4), the node manager 132 confirms with the volume manager 118 whether the lease on the volume 116 has been successfully created. In some embodiments, the node manager 132 may periodically poll the volume manger 118 with volume and lease identification information until the volume manager 118 indicates that the lease on volume 116 has been established.

At (5), the node manager 132 establishes connections to partition(s) of the volume 116 located in one or more BDS server systems 106 in order for the virtual machine 135 to access the volume 116. Illustratively, for each partition that a program 136 executing on the virtual machine 135 requests access, the node manager 132 may initiate a process to connect to a BDS server system 106 where the partition is located. The process may transmit identification information for the volume 116 and the lease, which allows the BDS server system 106 to locate the partition as requested. The BDS server system 106 may then compare the lease identification information transmitted by the process against the locally maintained lease identification information for the volume 106. If the two pieces of lease identification information match, the BDS server system grants the process access to the partition.

Example Volume Modification Routine

Figure 3:
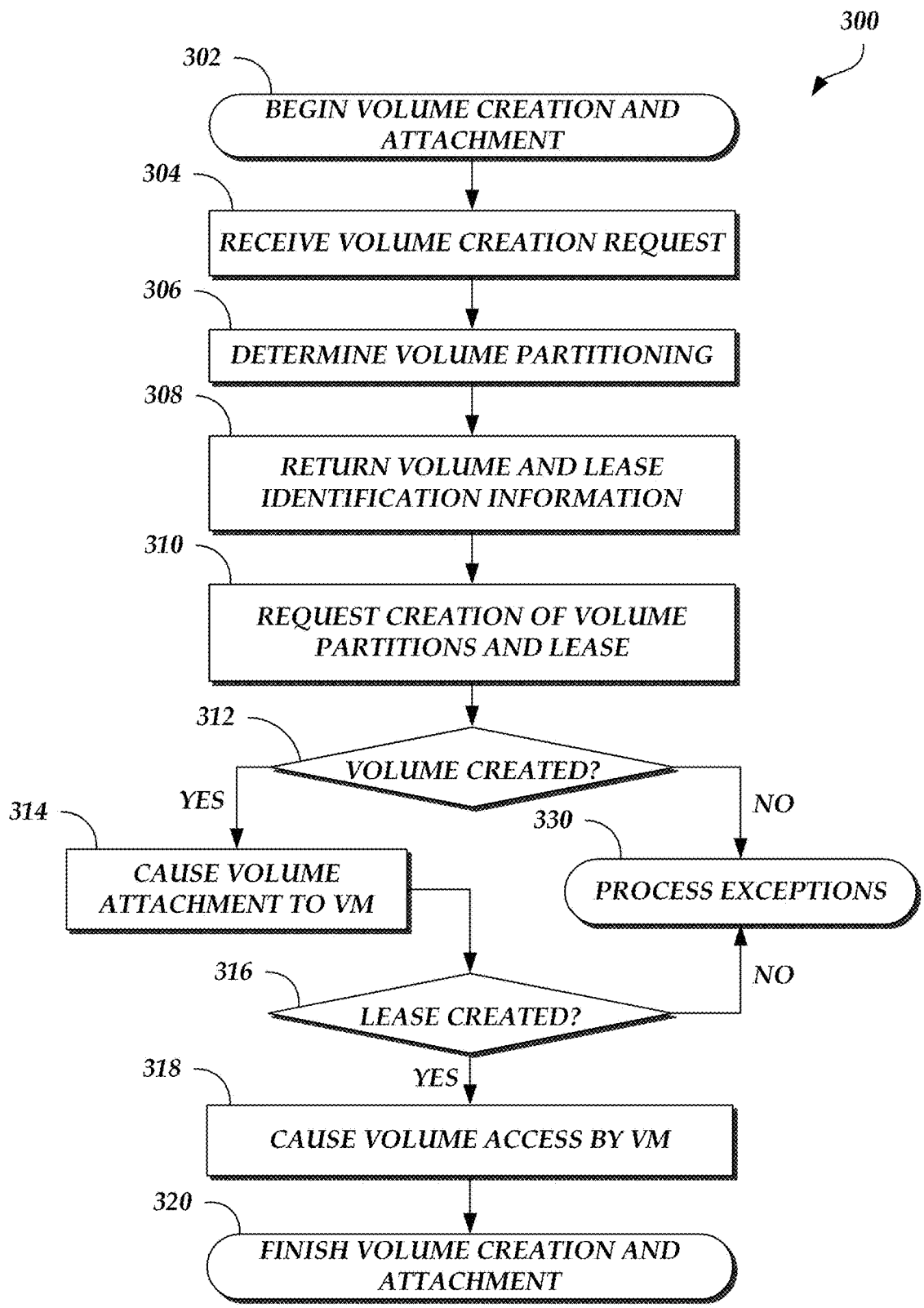
FIG. 3 is a flow diagram depicting a volume creation and attachment routine illustratively implemented by a volume manager of a management system in the data volume creation and leasing environment of FIG. 1, according to one embodiment.

FIG. 3 is a flow diagram depicting a volume creation and attachment routine 300 illustratively implemented by a volume manager 118 of a management system 108 in the data volume creation and leasing environment of FIG. 1, according to one embodiment. The volume creation and attachment routine 300 begins at block 302.

At block 304, the volume manager 118 receives a request to create one or more volumes 116 for use by one or more virtual machines 135. The volume creation request may be received from a host system manager 128 or a user device 102. Illustratively, the request can include an identification of one or more operational criteria of the volume(s) 116 (e.g., a storage capacity, a data storage type (e.g., hard disk drive (HDD), solid state device (SSD), Flash memory, hybrid storage devices, etc.), a level of expected performance (e.g., rate of input/output operations per second (IOPS), throughput, bandwidth, etc.), a geographical location, or the like). Additionally, the request may include identification information of the virtual machine(s) 135, associated user(s) or user device(s) 102, etc.

At block 306, the volume manager 118 determines the partitioning of the volume(s) 116 among various BDS server systems 106 or their associated data storage depositories. The volume manager 118 or an associated service may track various performance and capacity measurements of the BDS server systems 106, for example, by periodically polling individual BDS server systems 106. The volume manager 118 may compare the performance and capacity measures of the BDS server systems 106 against the operational criteria included in the volume creation request, and determine how a specific volume 116 should be partitioned among BDS server systems 106 and identify the BDS server system(s) 106 where volume (partitions) will be created. In some embodiments, the volume manger 118 may determine that the volume 116 should correspond to a single partition located within a specific BDS server system 106. In some embodiments, the volume manger 118 may determine that the volume 116 should correspond to multiple partitions each located within a distinct BDS server system 106. In other embodiments, the volume manger 118 may determine that the volume 116 may include a subset of partitions within a same BDS server system 106.

At block 308, the volume manager 118 generates identification information (e.g., respective unique alphanumeric identifiers) for the volume(s) 116 and lease(s) on individual volume 116, and returns the identification information to the requestor of volume creation. The generation of such identification information may be achieved by the volume manager 118 independently, or with interactions with one or more associated random number generators. In some embodiments, the identification information may include identifiers for multiple leases on one specific volume 116, so that individual leases can be utilized by different virtual machines 135 to access the volume 116 as a shared storage resource. In some embodiments, the identification information may include identifiers for multiple volumes 116 and a specific lease on the multiple volumes 116, so that a virtual machine 135 may access the multiple volumes 116 via the specific lease. The identification information for the lease may or may not be dependent on the identification information for the volume 116, and the two pieces of identification information may be generated sequentially or in parallel, by the volume manager 118. In some embodiments, the volume manger 118 also provides to the requestor volume partitioning information as well as identification information (e.g., network paths, domains, subdomains, or other identifiers) regarding BDS server system(s) 106 where each partition is located. It should be noted that block 308 can be performed before, during, or after block 306.

At block 310, the volume manager 118 sends request(s) to one or more BDS server systems 106 as identified at block 306 for creation of partition(s) of the volume 116 and for creation of the lease on the volume 116. Illustratively, responsive to the request(s), a BDS server system 106 may allocate data blocks in one or more storage devices for one or more volume partitions and provisions the partition(s) accordingly. The BDS server system 106 further stores the lease identification information or otherwise associates the lease identification information with the volume partition(s) as an authority for granting access. In some embodiments, a same request may include identification information for both the volume 116 and the lease, for example, as parameters or arguments in a same API or web service call. In some embodiments, the volume manager 118 may send two separate requests to individual BDS server systems 106. Illustratively, the volume manager 118 may send a first request for volume partition creation that includes identification information for the volume 116, and prior to confirming creation of the volume partition, sending a second request for lease creation that includes identification information for the lease.

At block 312, the volume manager 118 determines whether the volume 116 is successfully created. In some embodiments, individual BDS server system(s) 106 may send confirmation messages to the volume manager 118 following successful creation of volume partitions. In other embodiments, the volume manger 118 periodically polls individual BDS server system(s) 106 to determine availability of the volume partitions. Once all the partitions for the volume 116 are confirmed as being created, the volume manager 118 may determine that the volume 116 is successfully created and the routine 300 proceeds to block 314. If the volume manager 118 determines that the creation of volume 116 has failed, the routine 300 proceeds to block 330 where such unexpected failures are processed.

At block 314, the volume manager 118 causes the volume 116 to be attached to the virtual machine 135. Illustratively, the volume manager 118 may notify the user device 102, the host system manager 128, the node manager 132, or other components of the data center 140 associated with the virtual machine 135, directly or indirectly, of the availability of the volume 116, which may trigger the attachment of the volume 116 to the virtual machine 135. In some embodiments, the attachment of the volume 116 may be performed by the user device 102, the host system manager 128, the node manager 132, or other components of the data center 140 associated with the virtual machine 135 prior to any notification of the availability of the volume 116.

At block 316, the volume manager 118 determines whether the lease on the volume 116 is successfully created. In some embodiments, individual BDS server system(s) 106 may send confirmation messages to the volume manager 118 following successful creation of the lease on volume partitions. In other embodiments, the volume manger 118 periodically polls individual BDS server system(s) 106 to determine establishment of the lease. Once the volume manager 118 confirms establishment of the lease on all the partitions of the volume 116, the routine 300 proceeds to block 318. If the volume manager 118 determines that the creation of lease on the volume 116 has failed, the routine 300 proceeds to block 330 where such unexpected failures are processed. In some embodiments, blocks 312 and 316 may be combined such that the creations of the volume 116 and the leases are confirmed in a same step.

At block 318, the volume manager 118 causes the volume 116 to be accessed by the virtual machine 135. Illustratively, the volume manager 118 may notify a node manager 132 that manages the virtual machine 135, directly or indirectly, of the establishment of the lease on the volume 116, which may trigger the node manager 132 to establish network connections to BDS server system(s) 106. The node manager 132 may present identification information for the lease to the BDS server system(s) 106 and gain access to corresponding volume partition(s) for the virtual machine 135. The routine 300 ends at block 320.

As described above, routine 300 does not require a strict sequential order between an initial establishment of a data volume and a subsequent creation of lease on the data volume. Routine 300 enables at least some overlap of processing time between the creation of the data volume and the creation of the corresponding lease, for access by a virtual machine. This overlap in processing time may shorten the wait between an initiation of a request for the data volume and a time when a virtual machine may actually access the data volume, thus improving the efficiency and responsiveness of the network server provider's overall system.

Figure 4:
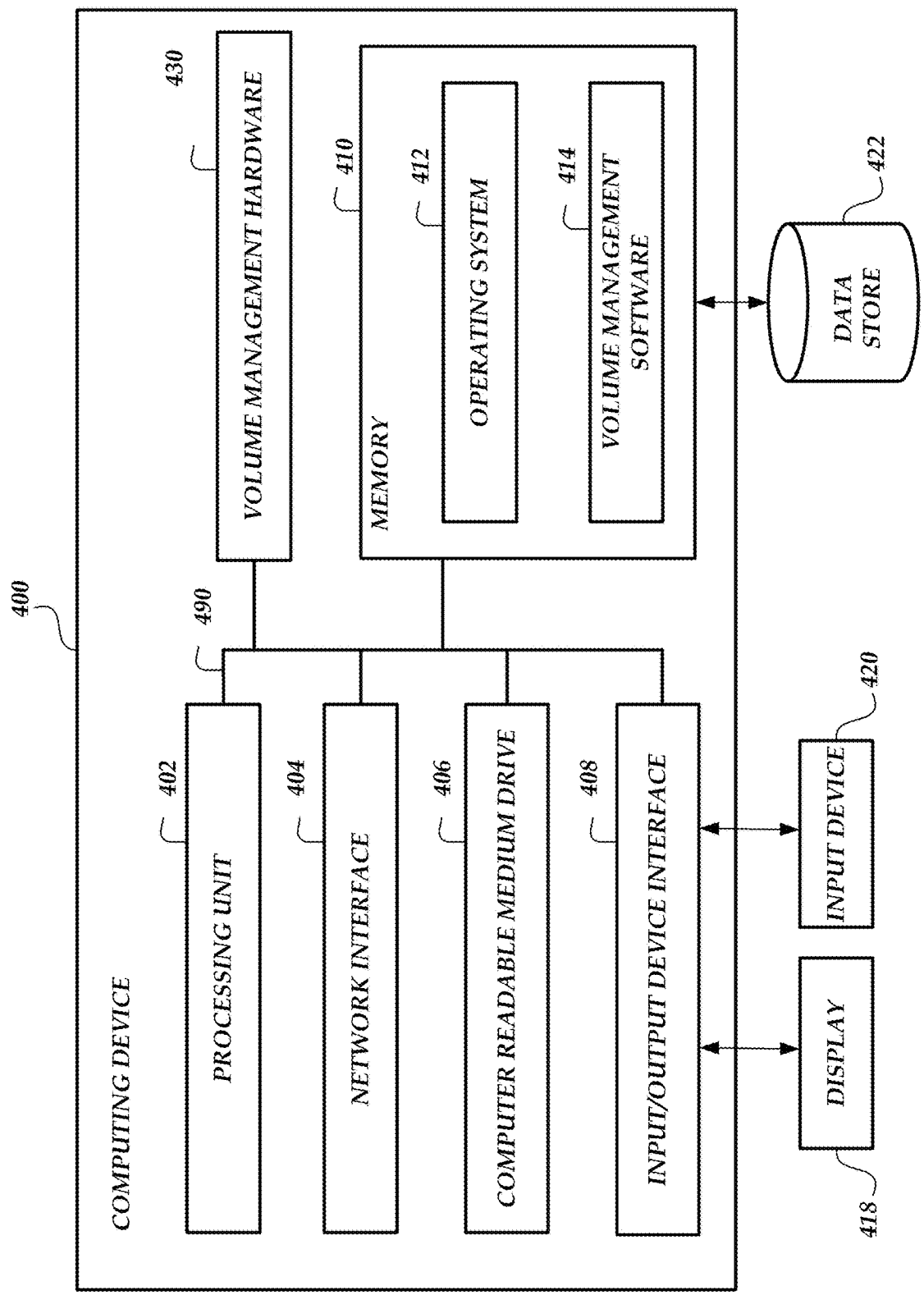
FIG. 4 is an illustrative functional block diagram of a computing device for managing the creation and leasing of a data volume.

FIG. 4 is an illustrative functional block diagram of a computing device for managing the creation and leasing of a data volume 116. The computing device 400 can be a server or other computing device, and can comprise a processing unit 402, a network interface 404, a computer readable medium drive 406, an input/output device interface 408, and a memory 410. The network interface 404 can provide connectivity to one or more networks (e.g., the internal network 115) or computing systems. The processing unit 404 can receive information and instructions from other computing systems or services via the network interface 404. The network interface 404 can also store data directly to memory 410. The processing unit 402 can communicate to and from memory 410 and output information to an optional display 418 via the input/output device interface 408. The input/output device interface 408 can also accept input from the optional input device 420, such as a keyboard, mouse, digital pen, microphone, mass storage device, etc.

The memory 410 contains computer program instructions that the processing unit 402 executes in order to implement one or more embodiments. The memory 410 generally includes RAM, ROM, and/or other persistent, non-transitory computer readable media. The memory 410 can store an operating system 412 that provides computer program instructions for use by the processing unit 402 or other elements included in the computing device in the general administration and operation of the computing device 400. The memory 410 can further include computer program instructions and other information for implementing aspects of the present disclosure. For example, in one embodiment, the memory 410 includes volume management software 414 that implements aspects of the present disclosure. The volume management software 414 may illustratively correspond to all or some of the components of the volume manager 118 or other relevant components depicted in FIG. 1, or the illustrative routine of FIG. 3.

The computing device 400 may further comprise volume management hardware 430. The volume management hardware 430 may illustratively implement aspects of the present disclosure, such as the components depicted in FIG. 1 or the illustrative routines of FIG. 3. In some embodiments, the volume management hardware 430 may be implemented in part with the processing unit 402, the computer readable medium drive 406, or other elements of the computing device 400.

The elements included in the computing device 400 may be coupled by a bus 490. The bus 490 may be a data bus, communication bus, or other bus mechanism to enable the various components of the computing device 400 to exchange information. In some embodiments, the computing device 400 may include additional or fewer components than are shown in FIG. 4. For example, a computing device 400 may include more than one processing unit 402 and computer readable medium drive 406. In another example, the computing device 402 may not be coupled to a display 418 or an input device 420. In still another example, the volume management software 414 or the volume management hardware 430 may include various interdependent or independent subcomponents implementing different aspects of the present disclosure. In some embodiments, two or more computing devices 400 may together form a computer system for executing features of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a plurality of servers, wherein individual servers of the plurality of servers are capable of hosting at least a portion of a data volume; and
   a management system comprising a processor and memory, wherein the memory is in communication with the plurality of servers and includes instructions that, when executed by the processor, cause the management system to at least:
   receive a volume creation request to create the data volume for use by a virtual machine;
   generate volume identification information for the data volume and lease identification information for a lease on the data volume;
   transmit the volume identification information and the lease identification information to the virtual machine;
   transmit at least the volume identification information to a server of the plurality of servers;
   prior to receiving a confirmation that space is available for the portion of the data volume on the server, transmit at least the lease identification information to the server, wherein the server establishes a lease on the portion of the data volume based at least partly on the lease identification information, and wherein the server associates the lease identification information with the portion of the data volume for comparison against a future request to access the portion of the data volume;
   receive the confirmation that the space is available for the portion of the data volume on the server; and
   generate a response to the volume creation request based at least partly on the confirmation that space is available for the portion of the data volume.

2. The system of claim 1, wherein the lease identification information corresponds to an alphanumeric identifier.

3. The system of claim 1, wherein the lease identification information is based at least partly on the volume identification information.

4. The system of claim 1, wherein the volume identification information and the lease identification information are transmitted to the server of the plurality of servers via a same request.

5. The system of claim 1, wherein the memory of the management system further includes instructions that, when executed by the processor, cause the management system to at least instruct attachment of the portion of the data volume to the virtual machine after the management system receives the confirmation that space is available for the portion of the data volume.

6. A computer-implemented method comprising:
   receiving, from a virtual machine, a volume creation request to create a data volume on a plurality of servers, wherein individual servers of the plurality of servers are capable of hosting at least a portion of the data volume;
   generating volume identification information for the data volume and lease identification information for a lease on the data volume;
   transmitting the volume identification information and the lease identification information to the virtual machine;
   transmitting at least the volume identification information to a server of the plurality of servers;
   prior to receiving a confirmation that space is available for the portion of the data volume, transmitting at least the lease identification information to the server, wherein the server establishes a lease on the portion of the data volume based at least partly on the lease identification information, and wherein the server associates the lease identification information with the portion of the data volume for comparison against a future request to access the portion of the data volume;
   receiving the confirmation that space is available for the portion of the data volume; and
   generating a response to the volume creation request based at least partly on the confirmation that space is available for the portion of the data volume.

7. The computer-implemented method of claim 6, wherein the lease identification information corresponds to an alphanumeric identifier.

8. The computer-implemented method of claim 6, wherein the lease identification information is based at least partly on the volume identification information.

9. The computer-implemented method of claim 6, wherein the volume identification information is transmitted the server of the plurality of servers separately from the lease identification information.

10. The computer-implemented method of claim 6, wherein the computer-implemented method further comprises:
receiving confirmation that the lease on the portion of the data volume is established, wherein the response to the volume creation request is generated based at least partly on the confirmation that space is available on the portion of the data volume and the confirmation that the lease on the portion of the data volume is established.

11. A non-transitory computer-readable medium having stored thereon executable program code that directs one or more computing devices to perform operations when executed by a data center operating on the one or more computing devices, the operations comprising:
receiving a volume creation request to create a data volume for use by a virtual machine;
generating volume identification information for the data volume and lease identification information for a lease on the data volume;
transmitting the volume identification information and the lease identification information to the virtual machine;
transmitting at least the volume identification information to a first server;
prior to obtaining confirmation that space is available on the first server for a first portion of the data volume, transmitting at least the lease identification information to the first server, wherein the first server establishes a lease on the first portion of the data volume based at least partly on the lease identification information, and wherein the first server associates the lease identification information with the first portion of the data volume for comparison against a future request to access the first portion of the data volume;
receiving a confirmation that space is available for the first portion of the data volume; and
generating a response to the volume creation request based at least partly on the confirmation that space is available for the first portion of the data volume.

12. The non-transitory computer-readable medium of claim 11 wherein the operations further comprise:
transmitting at least the volume identification information to a second server; and
receiving confirmation that space is available for a second portion of the data volume.

13. The non-transitory computer-readable medium of claim 12, wherein the operations further comprise:
prior to obtaining confirmation that space is available on the second server for the second portion of the data volume, transmitting at least the lease identification information to the second server for establishing a lease on the second portion of the data volume; and
receiving confirmation that the lease on the second portion of the data volume is established.

14. The non-transitory computer-readable medium of claim 11, wherein the volume identification information and the lease identification information are transmitted to the first server via a same request.

15. The non-transitory computer-readable medium of claim 11, wherein the volume identification information is transmitted to the first server via a first request and the lease identification information is transmitted to the first server via a second request that is separate from the first request.

16. The non-transitory computer-readable medium of claim 11, wherein the operations further comprise confirming that space is available for the first portion of the data volume based at least partly on polling the first server for availability of space for the first portion of the data volume.

17. The non-transitory computer-readable medium of claim 13, wherein the confirmation that space is available for the second portion of the data volume and the confirmation that the lease on the second portion of the data volume is established are received in a single confirmation message.

18. The non-transitory computer-readable medium of claim 11, wherein the operations further comprise:
receiving confirmation that the lease on the first portion of the data volume is established, wherein the response to the volume creation request is generated based at least partly on the confirmation that space is available on the first portion of the data volume and the confirmation that the lease on the first portion of the data volume is established.

* * * * *